Dec. 3, 1929.  N. MARTIN  1,737,858
ILLUMINATED NAME SIGN FOR AUTOMOBILES
Filed Oct. 31, 1924
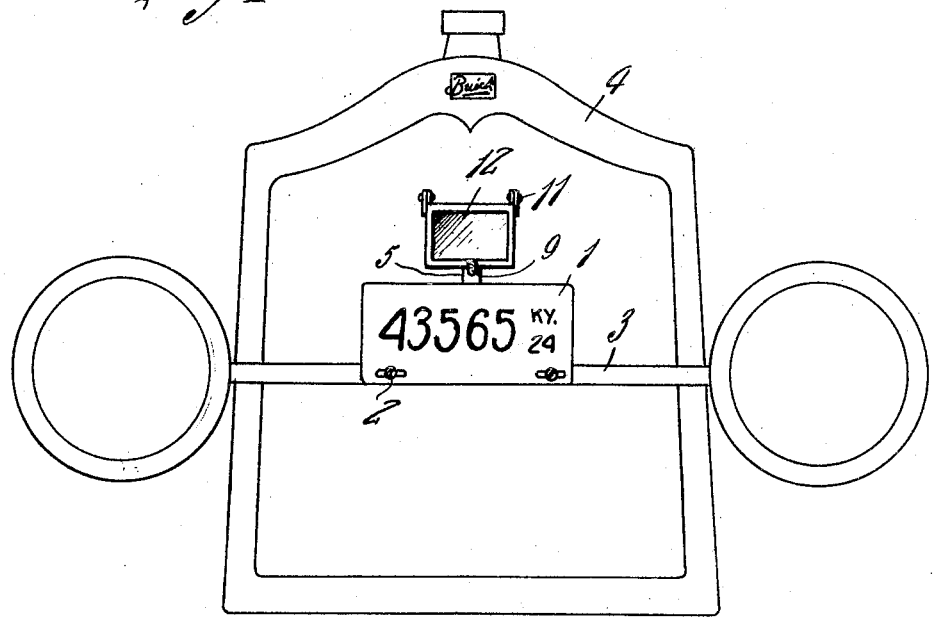
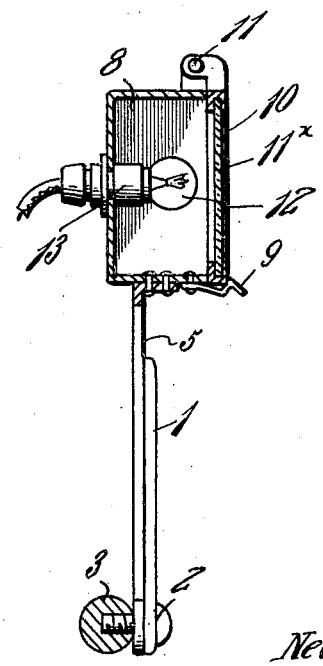
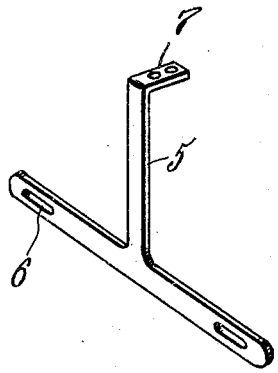
Nelson Martin
INVENTOR
BY Victor J. Evans
ATTORNEY Patented Dec. 3, 1929

1,737,858

UNITED STATES PATENT OFFICE

NELSON MARTIN, OF BOWLING GREEN, KENTUCKY

ILLUMINATED NAME-SIGN FOR AUTOMOBILES

Application filed October 31, 1924. Serial No. 747,078.

The object of my present invention is the provision of means for displaying to advantage the name of an automobile so that the name may be plainly discernible in the dark.

Other objects and practical advantages of the invention will be fully understood from the following description and claim, when the same are read in connection with the drawings, accompanying and forming part of this specification, in which:—

Figure 1 is a front elevation showing a portion of an automobile equipped with the preferred embodiment of my invention.

Figure 2 is an enlarged detail vertical section of the sign and its appurtenances.

Figure 3 is a detail perspective of the bracket for supporting the sign.

Similar numerals of reference designate corresponding parts in all of the views of the drawings.

I show in Figures 1 and 2 a license plate 1 attached at 2 to a transverse forward portion 3 of an automobile, the said transverse portion 3 being arranged in front of the radiator designated by 4. I also show in Figures 1 to 3 a bracket 5 of general inverted T-form. The said bracket 5 is arranged back of the license plate 1 and its horizontal portion is slotted at 6 for attachment to the portion 3 and the license plate 1 at the points 2. The upright portion of the bracket 5 is disposed back of the vertical center of the license plate 1, and terminates at its upper end in a horizontal arm 7.

Superposed on and fixed to the arm 7 of the bracket 5 is a lamp casing 8 which is open at its front side and is provided on its bottom wall with a beveled and resilient latch 9. The forward side of the casing 8 is normally closed by a door 10, hingedly connected at 11 to the upper portion of the casing 8 and adapted to be securely though yieldingly retained in closed position by the latch 9. The door includes an appropriate open frame, and a pane 11ˣ of transparent material, preferably glass, carried by the frame 10. The pane of transparent material 11 is provided as designated by 12 with the name of the automobile, the name being painted in a dark color on white glass or the name being provided in or on the glass or other transparent material 11 in such manner that when the interior of the casing 8 is illuminated the name will be prominently displayed and will be readily discernible in the dark.

Any appropriate means may be employed for the illumination of the interior of the casing 8 though I prefer to employ an ordinary incandescent electric lamp 12. The said lamp 12 is removably arranged in a socket 13 carried by the rear wall of the casing 8 and is designed to be supplied with current in the ordinary manner or in any other manner compatible with the purpose of my invention. Manifestly when the filament of the lamp 12 is caused to glow the name of the automobile will be prominently displayed, and will not only attract attention and inform an observer of the make of the automobile, but will enhance the finished appearance of the automobile in the day time when the lamp is idle as well as in the nightime when the lamp is in use for the illuminated display of the name.

It will also be apparent from the foregoing that my improvement is simple and inexpensive in construction and is susceptible of ready application to automobiles at present in use without the employment of skilled labor.

I have specifically described the preferred embodiment of my invention in order to impart an exact understanding of said embodiment. I do not desire, however, to be understood as confining myself to the structure disclosed, my invention being defined by my appended claim within the scope of which changes may be made without affecting my invention.

Having described my invention, what I claim and desire to secure by Letters Patent, is:—

A holder for automobile license plates comprising a horizontally disposed flat bar having elongated slots near each end for the passage of attaching devices and adapted to have a license plate attached thereto, a vertically disposed flat bar rising centrally from the horizontal bar and adapted to be positioned at the rear of said license plate, and a horizontally disposed arm extending forwardly from the top of the vertically disposed bar and having apertures therein for the passage of fastening devices and adapted to support a lamp housing above and forward of a license plate.

In testimony whereof I affix my signature.

NELSON MARTIN.